United States Patent  [11] 3,580,620

| [72] | Inventor | Adrian Gottfried Offenbroich<br>49 Sodra Forstadsgatan 211, Malmo,<br>Sweden |
|---|---|---|
| [21] | Appl. No. | 18,063 |
| [22] | Filed | Mar. 10, 1970 |
| [45] | Patented | May 25, 1971 |
| [32] | Priority | Mar. 11, 1969 |
| [33] | | Sweden |
| [31] | | 3,292/69 |

[54] FASTENING DEVICES
1 Claim, 4 Drawing Figs.

[52] U.S. Cl. ..................................... 287/54,
287/124
[51] Int. Cl. ....................................... F16b 7/00
[50] Field of Search ............................. 287/56,
124, 54 (B), 54 (C), 54 (A)

[56] References Cited
UNITED STATES PATENTS

| 2,855,255 | 10/1958 | Sonderstrup ................ | 287/54B |
| 3,008,741 | 11/1961 | MacCormack .............. | 287/54B |
| 3,458,052 | 7/1969 | Kann ........................... | 287/54A |

Primary Examiner—David J. Williamowsky
Assistant Examiner—Andrew V. Kundrat
Attorney—Beveridge and De Grandi ABSTRACT: Fastening device for disengageably joining a first and a second preferably tubular structural part, comprising an expander body, being at least partly slotted and nested in the open end of the first structural part and having a longitudinal chamber for a joining member, which on its end has a hook for engagement behind an edge portion of an opening in the second structural part and has a sloping surface for cooperation with the conical end of a screw, threadedly engaged in the expander body.

PATENTED MAY 25 1971

3,580,620

INVENTOR:
ADRIAN GOTTFRIED OFFENBROICH
by
Beveridge & DeGrandi
Attorneys

FASTENING DEVICES This invention relates to a fastening device for disengageably joining two structural parts in angular relationship, the first of said two structural parts being open at least at that end which is to be joined to the second structural part and having two opposed walls at said end, while the second structural part at the junction has an opening with an engageable edge portion, the fastening device comprising an expander body which is at least partly slotted longitudinally and has a cross-sectional shape conforming to that of the open end of the first structural part, said expander body being adapted to nest in said open end of the first structural part.

The requirements which are placed on the two structural parts are fulfilled by two tubes to be joined at right angles to one another, one of said tubes having an opening forming the engageable edge portion.

In a great many cases it is of course desirable disengageably to join for instance tubular elements in a stable but nevertheless rapid manner. Earlier, conventional screw connections or various types of so-called quick couplers have been widely used. However, all previously known devices suffered from the drawback of being difficult to manipulate and/or more or less visible on the outer side, with subsequent functional and aesthetical disadvantages.

The device according to the invention has many uses. Of typical uses, mention may be made of furniture frames, shelves and display stands, and wherever it is desired to attain stable and aesthetically pleasing structures that still permit rapid mounting and dismounting.

To this end, the novel fastening device comprises a joining member disposed in a substantially central chamber extending longitudinally of the expander body along the slot therein, hook means at the end of the joining member facing the second structural part for engagement with the edge portion of said second structural part, a sloping surface on said joining member engaged by a screw having a conical end and adapted to be screwed into the expander body so as first to move the joining member along the chamber for pressing the hook means against the edge portion of the second structural part and then to expand the expander body against the walls of the first structural part.

The invention will be more fully described in the following, reference being had to the accompanying drawing in which.

Figure 3:
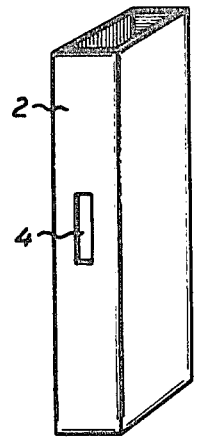
FIG. 3 is a perspective view of one tube.

In the embodiment illustrated two tubes 1 and 2 of rectangular cross section are disengageably joined substantially at right angles to one another. The first tube 1 has a small hole 3 for providing access to a screw to be described in the following. Of the entire fastening device the only visible detail is the screw in the small hole 3. The second tube 2 has a rectangular opening 4 (see FIG. 3) for the purpose indicated in the following.

Figure 4:
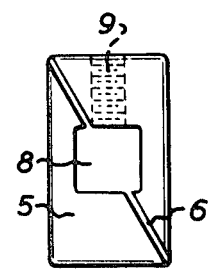
FIG. 4 is a view of the expander body as seen from the left in FIG. 1.

Inserted in the end of the first tube 1 is an expander body 5 of a cross-sectional shape conforming to that of the tube 1 (FIG. 4). The expander body 5 is slotted at 6 along one diagonal over the major portion of its length; the end of the slot 6 is indicated by a broken line 7 in FIG. 1. At the slot 6 the expander body 5 has a substantially central longitudinal chamber 8 which is of preferably square cross section. From one outer side of the expander body 5 a threaded hole 9 opens into the chamber 8, and when the body is correctly inserted in the cavity at the end of the tube 1 said hole 9 is aligned with the hole 3 of the tube 1.

A joining member 10 of a cross section conforming to that of the chamber 8 can be introduced into said chamber. At one end this member has a hook 11 which is insertable through the opening 4 in the second tube 2. The hook will engage behind the lower edge portion 12 (FIG. 1) of said opening. Moreover, the joining member has a recess 13 in conjunction with the threaded hole 9 in the expander body. The recess 13 has a sloping surface 14 with which engages the conical end of a screw 15 inserted in the threaded hole 9. The screw 15 preferably is a so-called hexagon-socket-head screw, whereby a bulky and ugly screwhead is dispensed with.

Figure 1:
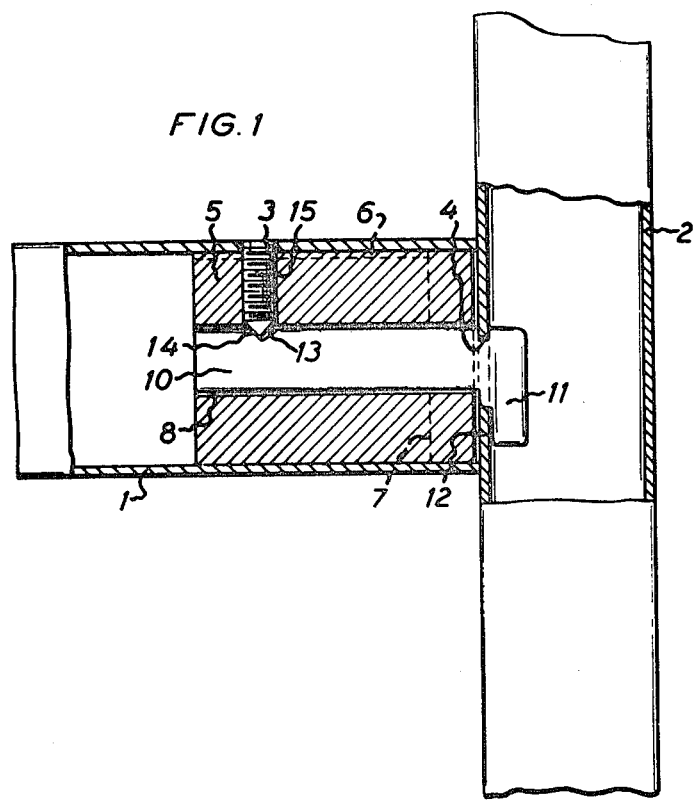
FIG. 1 is a side elevation, partly in section, of two tubular structural parts joined by means of the fastening device according to the invention.
Figure 2:
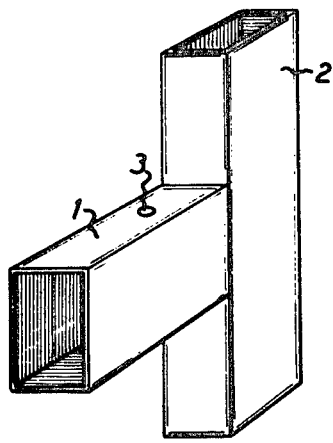
FIG. 2 is a perspective view of two joined tubes of rectangular cross section.

When the screw 15 is screwed into the joining member 10 the conical screw end will engage the sloping surface 14 of the recess 13 and move the joining member to the left in FIG. 1 so that the hook 11 of said member is engaged with the edge portion 12. Further tightening of the screw will move apart the portions of the expander body formed by the slot 6 and press them against the walls of the cavity in the tube 1.

This will result in an extremely stable joining of the two tubes owing to the engagement of the hook 11 with the edge portion 12, on the one hand, and the expansion of the expander body into engagement with the inner side of the tube 1, on the other hand. It should be observed that this effect is realized by external manipulation of but one element, the screw 15, in a single uncomplicated and rapid operation.

The construction, illustrated in FIG. 1, of the joining member 10 at the base of the hook 11 proper will provide a more reliable engagement of said hook with the opening 4 than with the use of a simple hook. Once it has been inserted and tightened in the opening, the hook 11 and the first tube 1, respectively, cannot at all or but in a slight degree be displaced by large laterally directed forces, which imparts additional mechanical reliability to the structure. For dismounting the two parts the joining member must first be released from the expander body and then be rotated to release the hook from the opening and the edge portion thereof.

The device can of course be modified in several ways within the scope of the appended claims. Thus it is not only possible to join two tubes of rectangular cross section at right angles, but also to fasten tubes of the most varying cross-sectional shapes in various angles to one another. In its most general form, the invention is applicable to joining one structural part having an open end and two opposed walls for the expander body to coact with, to another structural part having an edge portion for the hook 11 of the joining member 10 to coact with. Furthermore, the chamber 8 may be of circular cross section and the joining member 10 may be a bent length of round iron having a recess 13. Of course, it is also possible to slot the expander body in different ways and to provide several slots therein to attain the desired expanding action.

In an interesting modification of the invention the joining member is permanently secured in the second structural part, in which case the opening (with its edge portion) and the hook of the joining member naturally are dispensed with. The two-stage function of the device remains; whether the joining member is retained to the second structural part with the aid of the hook or in a more permanent way is insignificant in point of function.

It may be suitable for different reasons to manufacture the expander body from plastics material. The expander body may be made slightly conical so that in a manner of speaking it is wedged fast in the cavity of the first structural part, and further a raised portion may be provided on the surface of the expander body around the threaded hole therein, said raised portion engaging in the hole of the first structural part through which the screw is threadedly engaged in the expander body; in that case the hole must be made somewhat larger.

Finally, it should be mentioned that the two ends of the expander body can be caused to expand for better engagement with the first structural part, if the expander body is slotted from both ends, if the screw and the associated sloping surface of the joining member are placed close to the end of the first structural part to expand the end of the expander body facing the second structural part, and if the end of the joining member facing away from the second structural part is conical for coaction with a conforming surface in the chamber of the expander body and for expanding said body also at this end.

What I claim and desire to secure by Letters Patent is:

1. Fastening device for disengageably joining a first and a second structural part, comprising an expander body, being at least partly divided by a number of slots parallel with an axis of said body and having a cross-sectional shape conforming to an open-ended cavity in the first structural part to be nested therein, means in said expander body defining a chamber extending along said axis and opening into at least one end of said expander body, said slots opening into said chamber, a joining member slidably received in said chamber, hook means on one end of said joining member projecting from said one end of said expander body to engage behind an edge portion of an opening in the second structural part, a sloping surface on said joining member, screw means, and a conical end on said screw means, said screw means being threadedly engaged by said expander body for advancing said conical end, by turning of said screw means, into said chamber and into engagement with said sloping surface on said joining member first to displace said joining member along said chamber for pressing said hook means against the edge portion of the second structural part and then to expand said expander body against the walls of the cavity in the first structural part.